(No Model.) 2 Sheets—Sheet 1.
G. F. SIMONDS.
MACHINE FOR STRAIGHTENING, ROUNDING, AND CONDENSING SHAFTS.
No. 407,843. Patented July 30, 1889.
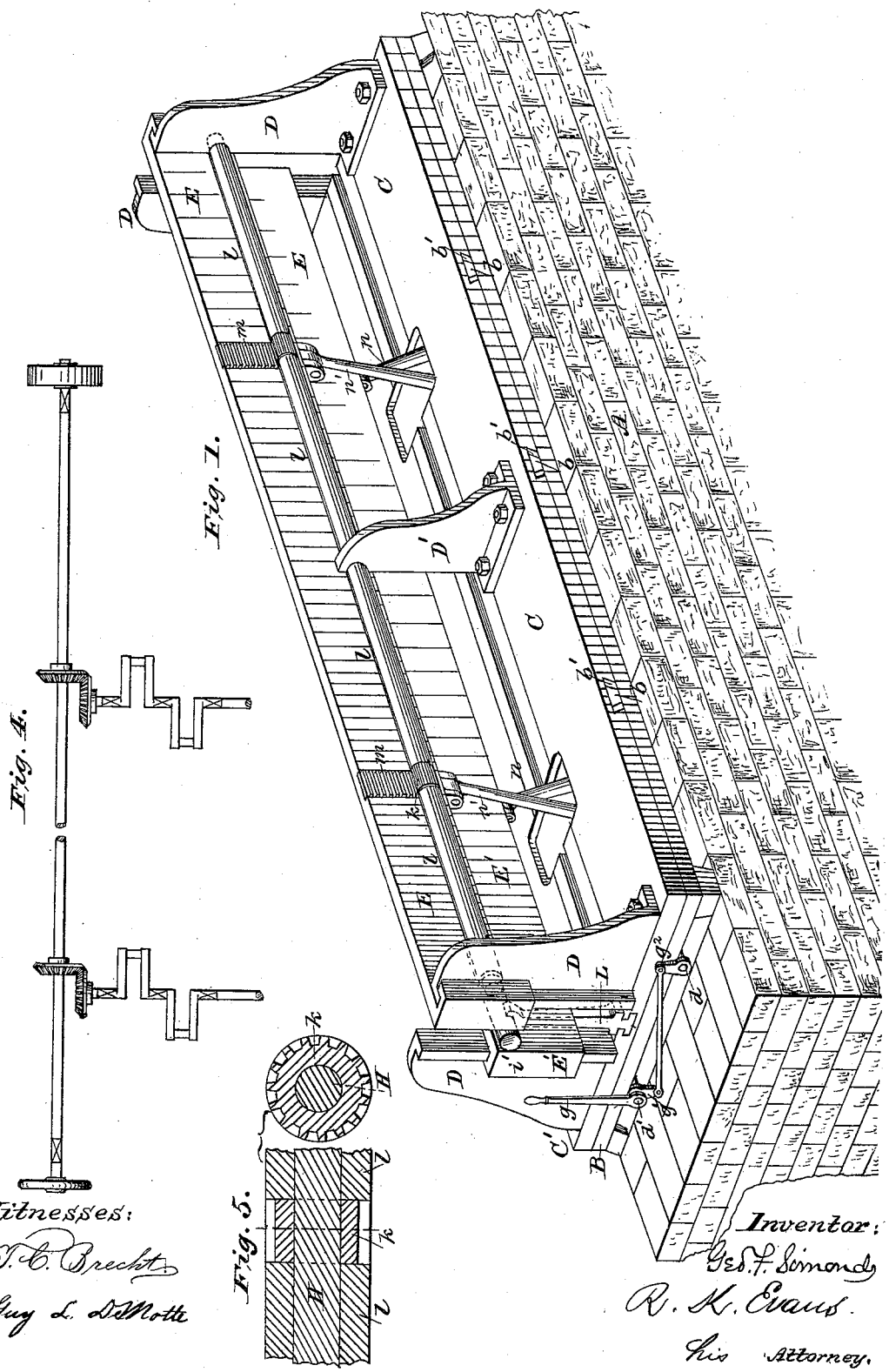

(No Model.) 2 Sheets—Sheet 2.
G. F. SIMONDS.
MACHINE FOR STRAIGHTENING, ROUNDING, AND CONDENSING SHAFTS.
No. 407,843. Patented July 30, 1889.
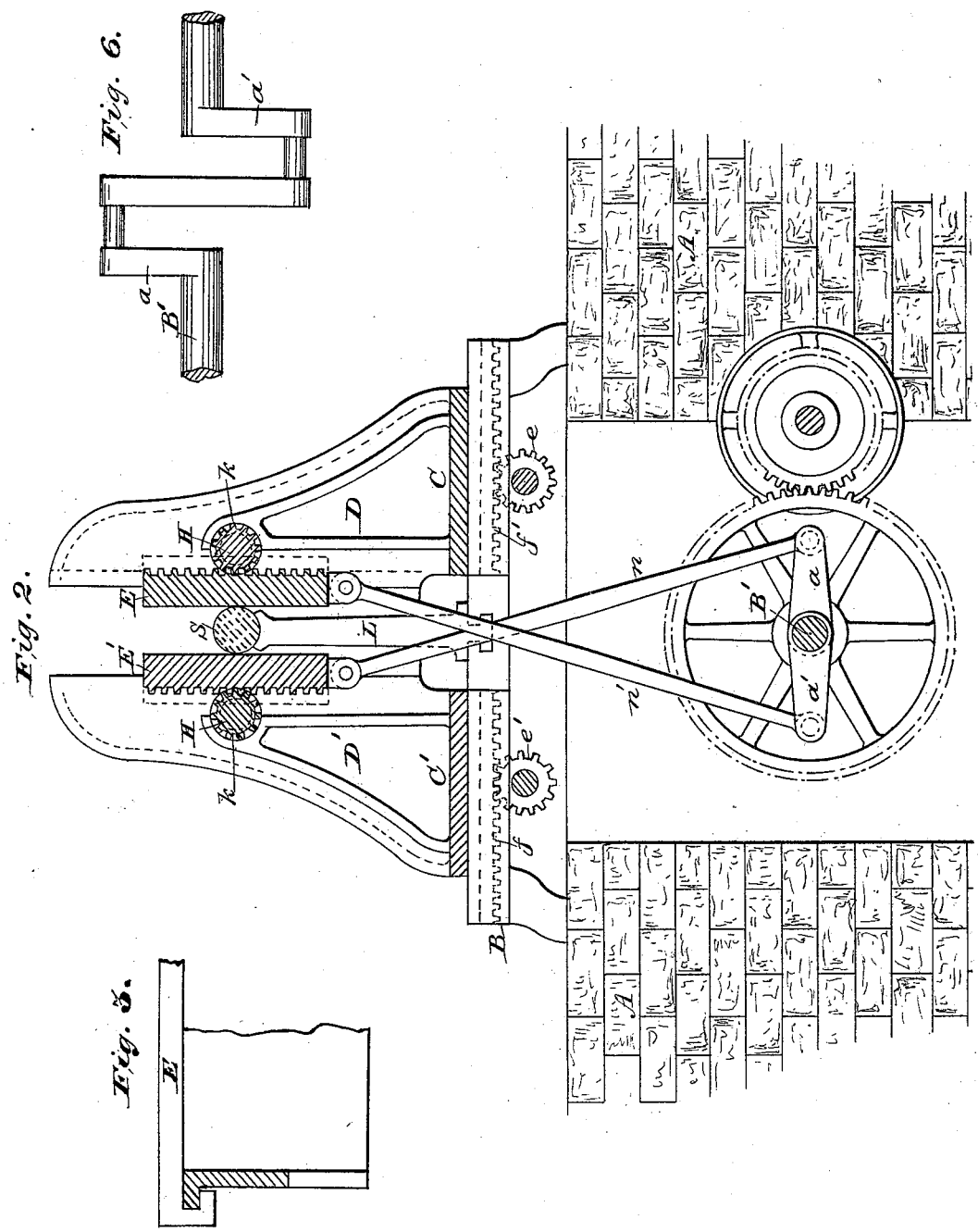

UNITED STATES PATENT OFFICE.

GEORGE F. SIMONDS, OF FITCHBURG, MASSACHUSETTS, ASSIGNOR TO THE SIMONDS ROLLING MACHINE COMPANY, OF MASSACHUSETTS.

MACHINE FOR STRAIGHTENING, ROUNDING, AND CONDENSING SHAFTS.

SPECIFICATION forming part of Letters Patent No. 407,843, dated July 30, 1889.

Application filed March 26, 1884. Serial No. 125,632. (No model.)

*To all whom it may concern:*

Be it known that I, GEORGE F. SIMONDS, of Fitchburg, in the county of Worcester and State of Massachusetts, have invented a new and useful Machine for Straightening, Rounding, and Condensing Shafts and Similar Articles; and I hereby declare the following to be a full, clear, and exact description of the same, reference being had to the accompanying drawings, making part of this specification, in which—

Figure 1 is a perspective view of the improved machine. Fig. 2 is a vertical cross-section of the same. Fig. 3 is a detail to be referred to. Fig. 4 is a modification of gearing to separate and bring together the platens. Fig. 5 shows two sections of the re-enforce shaft. Fig. 6 is an enlarged view of the crank shown in Figs. 1 and 2.

My invention relates to a machine for treating shafts and other cylindrical ponderous articles.

The invention consists in the combination and arrangement of mechanical devices hereinafter fully described, and specifically recited in the claims.

In order that those skilled in the art may make and use my invention, I will proceed to describe the manner in which I have carried it out.

In the said drawings, A is a masonry bed or other desirable foundation, on which the machine is to be placed, and having in it, as I show here for purposes of illustration, a central longitudinal recess, in which is located a driving-shaft B', provided with any desired number of operating-cranks $a$ $a'$, according to the length of the machine. The cranks $a$ $a'$ are one hundred and eighty degrees apart, or directly opposite each other.

The machine mounted on the masonry bed consists of a stationary bed-plate B, provided with dovetail transverse ribs $b$ $b$, on which slide two plates C C', provided with grooves $b'$ $b'$ to fit over the dovetail ribs $b$.

Throughout the length of each plate C C' and beneath the plate B are two shafts $d$ $d'$, carrying a series of pinions $e$ $e'$, which project through openings in plate B and engage with rack-bars $f$ $f'$ on the bottoms of plates C C', so that the pinions will cause, through the operation of compound levers $g$ $g'$ $g^2$ and shafts $d$ $d'$, the platens and their supporting devices to approach and recede from each other.

At intervals along the plate C C' rise heavy brackets D D', the four brackets D D at the ends forming end supports for long reciprocating platens E E' by means of the engaging yokes $i$ $i'$, and bearings for two very heavy shafts H H' passing the entire length of the machine and re-enforcing the platens so they cannot be sprung out of true lines.

At desired distances along the shafts H H' are secured collars $k$ $k$, provided with gear-teeth, and between each pair of collars or each collar and bracket is secured a sleeve $l$, of a diameter equal to the outside dimension of the gear-teeth on collars $k$ $k$, so that as a structure the shafts and sleeves shall substantially bear against the backs of the platens throughout their length, and, as before stated, fully re-enforce them. (See Fig. 5.)

Rack-bars $m$ $m$, secured at proper distances on the backs of the platens, engage with the teeth on collars $k$ $k$, so that as the platens are reciprocated vertically the shaft structures turn as the platens pass, and there is no rubbing of the platens against the re-enforcing devices.

At the proper points the cranks $a$ $a'$ are connected with the lower edges of the platens by means of connecting-rods $n$ $n'$, and as the cranks turn the platens are reciprocated in alternate opposite directions.

As it is probable that the friction of the platens alone would not be sufficient to support the heavy work S which this machine is designed to handle, I provide a central support L, movable or fixed, upon which the work rests, and sufficiently narrow to avoid contact with the platens. (See Fig. 2.)

Instead of operating the sliding plates C C' by means of the racks and pinions shown and described, a screw-gear can be substituted without departing from the spirit of my invention.

The shafting and connecting mechanism to reciprocate the platens can be made so that the cranks revolve in a longitudinal line with the machine, as seen in Fig. 4, instead of a transverse one, as seen in Figs. 1 and 2.

In operation the work is placed between the platens, resting on support L, and as the platens are reciprocated the plates C C' and the supported devices, including the platens, are made to approach each other by moving lever g, and the work is squeezed or rolled under pressure, whether treated hot or cold.

For heavy work I locate the bed B in relation to the platens E E', so that the article being operated upon rests upon a line with the floor.

Having thus described the invention, what I claim as new, and desire to secure by Letters Patent, is—

1. The bed-plate B, provided with holes through which project pinions $e\ e'$, and the sliding plates C C', provided with rack-bars $f f'$, in combination with the brackets D D' and reciprocating platens E E', all constructed, arranged, and operated as set forth.

2. The shaft B', provided with the double cranks $a\ a'$ and proper driving mechanism, and connecting-rods $n\ n'$, in combination with the reciprocating platens E E', brackets D D', plates C C', re-enforcing shafts H H', rack-bars $f\ f'$, and pinions $e\ e'$, provided with shafts $d\ d'$, all constructed, arranged, and operated as described.

3. The reciprocating platens and guides therefor, and actuating mechanism for reciprocating said platens simultaneously in opposite directions, combined with re-enforcing-shafts extending substantially the whole length of said platens, substantially as and for the purpose described.

GEO. F. SIMONDS.

Witnesses:
F. B. EVANS,
T. C. BRECHT.